(12) United States Patent
Ander (10) Patent No.: US 7,069,780 B2
(45) Date of Patent: Jul. 4, 2006

(54) GRAVITY TECHNIQUES FOR DRILLING AND LOGGING

(75) Inventor: Mark E. Ander, Austin, TX (US)

(73) Assignee: Ander Laboratory Inc., Austin, TX (US)

( * ) Notice: Subject to any disclaimer, the term of this patent is extended or adjusted under 35 U.S.C. 154(b) by 0 days.

(21) Appl. No.: 10/806,049

(22) Filed: Mar. 22, 2004

(65) Prior Publication Data

US 2004/0250614 A1 Dec. 16, 2004

Related U.S. Application Data

(60) Provisional application No. 60/456,766, filed on Mar. 21, 2003.

(51) Int. Cl.
*G01V 7/04* (2006.01)
(52) U.S. Cl. .................................... 73/382 R
(58) Field of Classification Search .............. 73/382 R, 73/382 G, 152.02, 152.03, 152.05; 175/40, 175/45, 50, 73, 61; 166/252.2
See application file for complete search history.

(56) References Cited

U.S. PATENT DOCUMENTS

| | | | |
|---|---|---|---|
| 4,040,189 A | 8/1977 | LaCoste | 33/304 |
| 4,457,077 A | 7/1984 | Lautzenhiser | 33/304 |
| 4,457,168 A | 7/1984 | Lautzenhiser et al. | 73/382 R |
| 4,475,386 A | 10/1984 | Fitch et al. | 73/151 |
| 4,517,836 A | 5/1985 | Lyle, Jr. et al. | 73/152.06 |
| 4,581,932 A | 4/1986 | Lautzenhiser et al. | 73/382 G |
| 4,602,508 A | 7/1986 | Fitch et al. | 73/382 G |
| 4,625,547 A | 12/1986 | Lyle, Jr. | 73/152.05 |
| 4,803,479 A | 2/1989 | Graebner et al. | 340/854.1 |
| 5,218,864 A | 6/1993 | Pennybaker | 73/152.05 |
| 5,448,912 A | 9/1995 | Black | 73/152.02 |
| 5,821,413 A | 10/1998 | Chapin | 73/152.05 |
| 5,970,787 A | 10/1999 | Wignall | 73/152.54 |
| 6,450,028 B1 * | 9/2002 | Vail, III | 73/382 G |

FOREIGN PATENT DOCUMENTS

WO    WO 96/10759    4/1996

OTHER PUBLICATIONS

Adams, "Gas saturation monitoring in North Oman Reservoir using a borehole gravimeter," *SPE Middle Ease Oil Show*, in Baharain, Nov. 16-19, 1991.

Alixant et al., "First monitoring well in the rabi filed: design and data gathering," *Society of Petroleum Engineers*, SPE 28399, 1994.

Alixant et al., "In-situ residual oil saturation to gas from time-lapse borehole gravity," *Society of Petroleum Engineers*, SPE 30609, 1995.

(Continued)

*Primary Examiner*—Robert Raevis
(74) *Attorney, Agent, or Firm*—Hulsey Intellectual Property Lawyers, P.C.

(57) ABSTRACT

Techniques for using gravity in applications such as drilling and logging. Techniques are present for (1) gravity well logging using gravity sensors arrays; (2) creating density pseudosections using gravity measurements; (3) performing Gravity Measurement While Drilling (GMWD) using single or multiple gravity sensors; and (4) geosteering using GMWD.

6 Claims, 5 Drawing Sheets

OTHER PUBLICATIONS

Ander and Chapin, "Borehole gravimetry: a review," *Society of Exploration Geophysics 67th Annual International Meeting Expanded Abstracts*, Dallas, GM 3.1, 531-534, Nov. 2-7, 1997.

Ander and Chapin, "Borehole microgal gravimetry: instruments, observations, and applications," *Abstracts of the American Geophysical Union Chapman Conference on Microgravimetry: Instrumentation, Observations and Applications*, Flagler College, St. Augustine, FL, Mar. 3-6, 1997.

Ander and Summers, "The deep penetration density logging tool," *Transactions of the 16th European Formation Evaluation Symposium, Society of Professional Well Log Analysts*, Aberdeen, Scotland, Oct., 1994.

Ander and Summers, "LaCoste & Romberg gravity meter: tares, drift and temporal mass variation," *Society of Exploration Geophysics 67th Annual International Meeting Expanded Abstracts*, Dallas, GM 1.8, 498-501, Nov. 2-7, 1997.

Beyer, "Borehole gravity program of the U.S. Geological Survey (1963-1975)—brief history and basic data," *USGS Open File Report*, 80-903, Jul., 12, 1980.

Black et al., "A digital borehole gravity logging system," *Second International Symposium on Borehole Geophysics for Minerals, Geotechnical, and Ground Water Application*, Oct., 6-8, 1987.

Bradley, "The application of the borehole gravimeter to the evaluation and exploration of oil and gas reserves," *Society of Exploration Geophysics, 45th Annual International Meeting Expanded Abstracts*, Denver.

Bradley, "The commercial application and interpretation of the borehole gravimeter," AMOCO Production Company, Report.

Caton, "Improved methods for reducing borehole-gravity data—application sand analyses of reduced gravity plots," *SPWLA 22nd Annual Logging Symposium*, Jun. 23-26, 1981.

Chapin et al., "Advances in deep-penetration density logging," *Society of Petroleum Engineers*, SPE 59689, 2000.

EDCON Borehole gravity meter brochure #1, no date.
EDCON Borehole gravity meter brochure #2, no date.
EDCON Borehole gravity meter brochure #3, no date.
EDCON Borehole Gravity Density Logging Report, no date.
EDCON, Inc., Proposal for the development of a guide to borehole gravity use in salt dome oil and gas investigations, Jul. 15, 1994.

Folle and Rolfs, "Gravimeter yields rock density for cavern during operations," *Oil & Gas J.*, Jan. 22, 1996.

Gas Research Institute, "New borehole tool provides more accurate downhole density determination for thin beds," *GRI Technology Focus*.

Gournay and Lyle, "Determination of hydrocarbon saturation and porosity using a combination borehole gravimeter (BHGM) and deep investigating electric log," *Society of Professional Well Log Analysts, 25th Annual Logging Symposium*, 1-13, Jun. 10-13, 1984.

Gournay and Maute, "Detection of bypassed gas using borehole gravineter and pulsed neutron capture logs," *The Log Analyst*, May-Jun., 27-32, 1982.

Hare et al., "The 4-D microgravity method for waterflood surveillance: a model study for the Prudhoe Bay reservoir, Alaska," *Geophysics*, 64(1):78-87, 1999.

Hearst et al., "Potential uses for a high-temperature borehole gravimeter," *Lawrence Livermore Laboratory*, UCRL-52421, Mar. 8, 1978.

Herring, "Introduction to borehole gravity," *EDCON report*, Feb., 1990.

Jageler, "Improved hydrocarbon reservoir evaluation through use of borehole gravimeter data," *Society of Petroleum Engineers of AIME*, SPE 5511, 1975.

Labo, "A practical introduction to borehole geophysics," *Society of Exploration of Geophysicists, Geophysical Reference Series No. 2*, Chapter 9, 1987.

LaFehr, "Rock density from borehole gravity surveys," *Geophysics*, 48(30:341-356, 1983.

Li and Chouteau, "On density derived from borehole gravity," *The Log Analyst*, 40(1):33-37, 1999.

MacQueen, "Inversion of borehole gravimeter data," *Borehole Geophysics 3: Hardware and Methods*, 57-58.

McCalpin, "Operational and technical results of a multiwell borehole gravity survey," *Unconventional Methods in Exploration IV*, 313-320.

McCullouh et al., "The U.S. Geological Survey- LaCoste and Romberg precise borehole gravimeter system-instrumentation and support equipment," *Geological Survey Research*, D92-D100, 1967.

McCullouh, "Application of gravity measurements in wells to problems of reservoir evaluation," *SPWLA 9th Annual Logging Symposium*, Jun. 23-26, 1968.

McCullouh et al., "The U.S. Geological Survey-LaCoste and Romberg precise borehole gravimeter system-test results," *Geological Survey Research*, D101-D112, 1967.

Orange and Howe, "Borehole gravity meter applications to natural gas exploration and development," *Emerald Exploration Consultants*, 1987.

Popta and Adams, "Gravity gains momentum," *Middle East Well Evaluation Review*, Nov. 12, 1992.

Rasmussen, Borehole gravity survey planning and operations,*SPWLA 14th Annual Logging Symposium*, May 6-9, 1973.

Rasmussen, The successful use of the borehole gravity meter in Northern Michigan, *The Log Analyst*, 3-10, 1975.

Robbins, "Bibliography with abridged abstracts of subsurface gravimetry (especially borehole) and corresponding in-situ rock density determinations," *Open-file Report*, 80-710, 1980.

Schultz, "Monitoring fluid movement with the borehole gravity meter," *Geophysics*, 54(10):1267-1273, 1989.

Smith, "The case for gravity data from boreholes," *Geophysics*, 15(4):605-636, 1950.

Valliant, Gravity meter calibration at LaCoste and Romberg, *Geophysics*, 56(5):705-711, 1991.

* cited by examiner

GRAVITY TECHNIQUES FOR DRILLING AND LOGGING

The present application claims priority to, and incorporates by reference, U.S. Provisional Patent Application Ser. No. 60/456,766, which was filed on Mar. 21, 2003.

BACKGROUND OF THE INVENTION

1. Field of the Invention

This disclosure relates generally to gravity and its uses in applications such as drilling and logging.

2. Background

A. Subsurface Gravity Background

Subsurface gravity may have began with pendulum measurements made during 1826, 1828, and 1854 by Airy (1856) who sought to determine the mean density of the earth by measuring the interval vertical gradients between the top and bottom of various mine shafts. Similar measurements were made by von Sterneck in 1883 and 1885 and by Rische from 1871 to 1902. It was not until the development of the portable gravity meter in the 1930s that extensive studies of subsurface gravity became possible. Since then, gravity measurements have been made in mine shafts to determine the densities of adjacent rocks, to determine the mean density of the earth, and to study anomalous vertical gradients caused by the large positive density contrasts associated with ore bodies. The concept of a borehole gravity meter for gravity logging of wells was first proposed in the 1950s, and development of the high-precision borehole gravity meter (BHGM) began in the 1960s.

Subsurface gravity measurements (e.g. in boreholes or in mines) are used to detect anomalous density structure or lateral density variations. These density variations are typically due primarily to stratigraphic, structural, or diagenetic effects that cause subsurface iso-gravity contours of equal gravity to depart from the horizontal. However, interpreting density variations is difficult, in part, because density models are not unique—in other words, different models can be used to describe the same density variations. In theory, an infinite number of density-volume model configurations can be devised to generate the same gravity anomaly. But, in many cases, a uniform, horizontal layered earth can be assumed as a useful model because formations surrounding gravity measurements are typically lateral or nearly-so and possess relatively-uniform densities in lateral directions. In such areas, subsurface gravity data are easily converted to accurate and unique interval density profiles.

Lateral density variations may be significant where folded strata, faults, unconformities, intrusions, or lateral variations in lithology, porosity or pore fluids (due to selective depositional or post-depositional processes) intersect or occur within detectable distances of a borehole. Under these circumstances, analysis of borehole gravity data is more difficult because equal density surfaces generally are poorly known and may be complex in shape.

While most other geophysical logging tools only sample in the local area of the borehole, the classical BHGM log samples a large volume of rock. Consequently, it is not significantly influenced by drilling mud, fluid invasion, hole rugosity, or formation damage that surrounds all wells to some degree. It is the ability of the BHGM log to yield a direct measure of in situ density and porosity and to characterize pore content that forms the basis of its application to oil and gas exploration and production.

Borehole gravity surveys have proven to be worthwhile at least because of their:
(1) High relative or absolute accuracy;
(2) Direct density response; and
(3) Ability to investigate a large volume of formation.

Borehole gravimetry is also useful due to its ability to measure apparent density. Traditional logging tools only measure into a formation a few inches, whereas borehole gravity samples tens to hundreds of meters into the formation. One aspect of the BHGM that makes it an attractive logging tool in the petroleum industry is its ability to detect the contacts between gas, oil, and water at large distances from the borehole. It also can do this through multiple casing strings and formation damage, which decreases the effectiveness of the competing pulsed neutron tools for fluid saturation monitoring, as does low salinity water.

B. Physics of Subsurface Gravity

Gravity exploration utilizes Newton's Law of Universal Gravitation, $$\text{Force} = G\frac{m_1 m_2}{r^2}. \tag{1}$$

This law states that, between any two massive objects, there is a force, which is directly proportional to the product of their masses and inversely proportional to the square of the distance between them. Thus, the force of attraction is larger for larger masses but decreases rapidly for increasing distances between the masses. The constant of proportionality, G, is the Universal Gravitational Constant. A gravity sensor (or gravity meter) uses a very sensitive mass balance mechanism to measure the force of gravity acting on a test mass (often called a proof mass).

Using Newton's Second Law of Motion, the force on a test mass $m_2$ can be expressed as $$\text{Force} = m_2 g, \tag{2}$$

where g is the gravity or gravitational acceleration experienced by the test mass due to the force of gravity. Equations (1) and (2) can be combined to give:

$$g = \frac{\text{Force}}{m_2} = G\frac{m_1}{r^2}. \tag{3}$$

Thus gravity is expressed in units of force per unit area or acceleration. In geophysics, the units of centimeters/second is called "gal", after Galileo. Land, airborne and marine gravity surveys are typically recorded in units of milli-gal or mgal and borehole gravity surveys are typically given in units of micro-gal or µgal.

Figure 1:
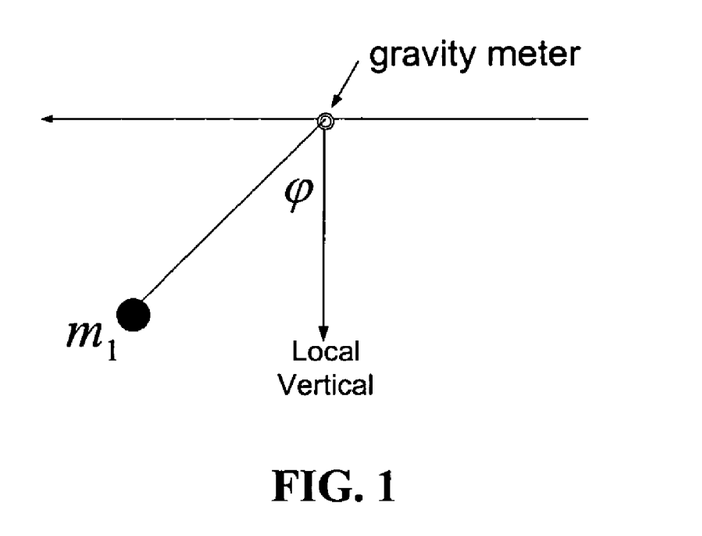
FIG. 1 shows a gravitational attraction of a point mass.

Although gravity is a tensor, most exploration gravity meters are only sensitive to the vertical component of gravity, $g_z$, which is in the direction of the local plumbline. Therefore, the acceleration experienced by a gravity meter test mass is $$g_z = G\frac{m_1}{r^2}\cos\varphi, \tag{4}$$

where φ is shown in FIG. 1.

Usually gravity exploration involves the spatial distribution of rocks whose densities and volumes are partly known or can be inferred. Because mass=density×volume, we can rewrite equation (4) as $$g_z = G\frac{\rho V}{r^2}\cos\varphi, \quad (5)$$

where $\rho$ is the density and V is the volume. For practical purposes, we integrate Equation (5) over the entire volume, $$g_z = G\int_v \frac{\rho}{r^2}\cos\varphi dV. \quad (6)$$

Equation (6) calculates the vertical component of gravity at any point due to any mass, where mass is defined in terms of density and volume. Therefore density models can be constructed using Equation (6) to simulate proposed geologic models and their gravity fields so that the models can be compared with actual measured gravity values. There are many commercially-available software packages available for doing this. Many of them are based on an algorithm developed by Talwani (1965).

If the earth is assumed to be non-rotating and perfectly spherical with a radially symmetric density distribution, with a radius of R and a mass of M, then, from Equation (3), the gravity on the earth's surface will be $$g = G\frac{M}{R^2}. \quad (7)$$

and the free-air gradient of gravity at the surface of the earth will be $$\frac{\partial g}{\partial r}\bigg|_{r=R} = -\frac{8}{3}\pi G\bar{\rho}_R \quad (8)$$

where $\bar{\rho}_R$ is the bulk mean density of the earth. At any point inside the earth at a radius of r from the earth's center, the mass of a sphere of radius r is given by $$m_r = 4\pi \int_0^r \rho(r)r^2\, dr \quad (9)$$

where $\rho_r$ is the internal density as a function of r. Substituting $m_r$ in Equation (9) for M in Equation (7) gives the gravity at this point (Benfield, 1937)

$$g = \frac{4\pi G}{r^2}\int_0^r \rho(r)r^2 dr \quad (10)$$

because the net attraction of a spherical shell between r and R is zero (Ramsey, 1940). The vertical gradient of gravity at this point is $$\frac{\partial g}{\partial r} = \frac{4\pi G}{r^2}\frac{\partial}{\partial r}\int_0^r \rho(r)r^2 dr + \int_0^r (r)^2 dr\frac{\partial}{\partial r}\frac{4\pi G}{r^2}, \quad (11)$$

which reduces to $$\frac{\partial g}{\partial r} = 4\pi G\bar{\rho} - \frac{8}{3}\pi G\bar{\rho}_r, \quad (12)$$

where $\bar{\rho}$ is the density of an infinitesimally thin spherical shell of radius r and $\bar{\rho}_r$ is the mean density of the interior sphere of radius r. See Airy (1856), Miller and Innes (1953), Gutenberg (1959), Hammer (1963), and Beyer (1971) for further discussions. From Equation (8) we see that the second term in Equation (12) is the free-air vertical gradient of gravity for a non-rotating spherical earth.

In order to predict the gravitational field of the earth precisely at any point on the earth, we must know and correct for the shape and density distribution with the greatest possible accuracy. The earth is not actually a sphere because it rotates and thus bulges at the equator and flattens at the poles. Its shape can be closely approximated by an oblate spheroid with an eccentricity of 1/297. The rotation and general ellipsoidal shape of the earth can be taken into account by replacing the second term in Equation (12) with the normal free-air vertical gradient, which can be determined by using the spheroid model based on a best-fit reference model of gravity at mean sea level as a function of latitude $\phi$. This reference standard model is established by the International Union of Geodesy and Geophysics. The accepted model was last updated in 1967 and is $$g_{1967} = [9.7803090 + 0.058552\sin^2\phi - 5.70\times10^{-5}\sin^2 2\phi]\, m\, s^{-2} \quad (13)$$

or in ft s$^{-2}$ $$g_{1967} = [32.0875312 + 0.192099\sin^2\phi - 1.87\times10^{-4}\sin^2 2\phi]\, ft\, s^{-2}. \quad (14)$$

This reference standard model says that gravity varies at mean sea level from 978,030.90 mgal at the equator to 983,884.10 gal at the poles, which is a total range of 5,853.20 mgal. Note that the gravity is larger at the poles than at the equator because the equator is farther from the earth's center of mass than are the poles. The normal free-air vertical gradient is $$F = \frac{\partial \gamma}{\partial h} = 0.094112 - 0.000134\sin^2\phi - 0.134\times10^{-7}h \quad (15)$$

where h is the elevation in feet. The normal free-air gradient of gravity varies from the equator to the poles by less than 0.2% and with elevation by about 0.01% per 1,000 feet or 0.05% per kilometer (see Hammer, 1970). These variations are very small for gravity surveys made in boreholes and can be approximated by $$F = \frac{\partial \gamma}{\partial h} = 0.09406 \text{ mGal/ft.} \quad (16)$$

When this is substituted for the second term in Equation (12), we obtain the vertical density $\bar{\rho}$ of the laterally adjacent rocks for the case in which the earth possesses a radially symmetrical distribution of density $$\frac{\partial g}{\partial r} = 4\pi G\bar{\rho} - F = 4\pi G\bar{\rho} - 0.9406 \quad (17)$$

or, changing from elevation, h, to depth, z, we have $$\Delta g = F\Delta z - 4\pi G\bar{\rho}\Delta z \quad (18)$$

or $$\Delta g = 0.09406\Delta z - 4\pi G\bar{\rho}\Delta z \quad (19)$$

Equation (18) is a fundamental equation of borehole gravity. The $4\pi G\bar{\rho}$ term applies to an infinitely extended horizontal layer of thickness $\Delta z$. According to Equation (18), gravity increases downward at a rate determined by the difference between the free-air vertical gradient F, which is essentially a constant, and a gradient of opposite sign, $4\pi G\bar{\rho}$, that varies as the density of the adjacent rocks change. The positive term is due to an increase in gravity downward caused by closer approach to the center of the earth and the negative term is twice the attraction of an infinitely extended horizontal layer of thickness $\Delta z$. Therefore, increases in layer density correspond to decreases in the interval vertical gradient $\Delta g/\Delta z$, and vise versa. Thus it is often possible to accurately determine very small variations in the density of rocks bracketed by different $\Delta z$ intervals with little or no analysis beyond the simple reduction of the basic gravity and depth measurements, which is one of the great strengths of borehole gravity.

C. Present Borehole Gravity Logging Technology

Figure 2:
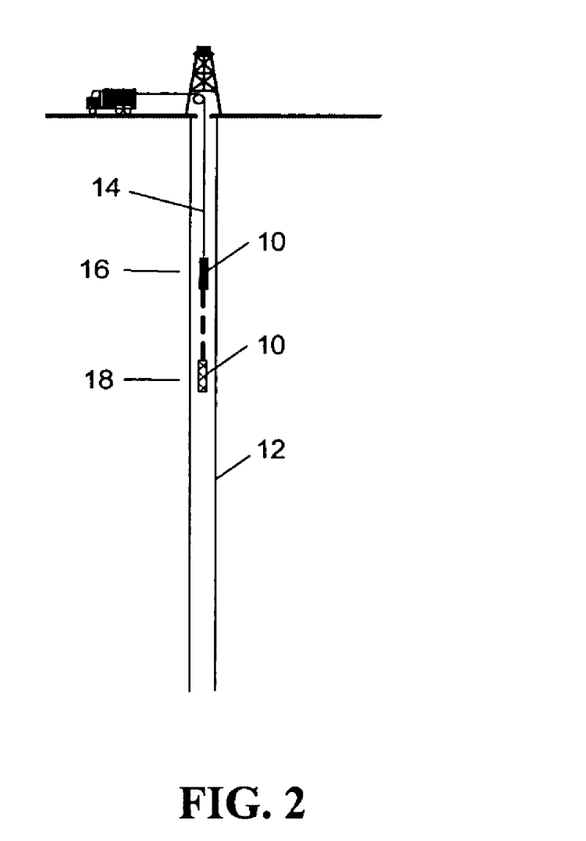
FIG. 2 shows conventional borehole gravity logging.

FIG. 2 illustrates a conventional borehole gravity survey. At present, borehole gravity logging is conducted using a BHGM, which consists of a single gravity sensor located in a logging sonde (10). The BHGM logging sonde is lowered down the well (12) on the end of a wireline (14). All the measurements are taken at stationary locations because any gravity sensor acceleration will be measured in addition to the gravity (due to the Principle of Equivalence). Measurements are taken at (16) and (18) in order to determine the apparent density of the intervening layer. The first measurement is taken at (16). The gravity measured at (16) is due to the mass of the intervening slab of density $\rho$ and of thickness $\Delta z$, as given by Equation (18), plus the gravity due to the mass of the rest of the universe, $$g_{(10)} = 2\pi G\rho\Delta z + g(\text{universe}). \quad (20)$$

The second measurement is taken at (18). Similarly, the gravity measured at (18) is due to the mass of the intervening slab of density $\rho$ and of thickness $\Delta z$ plus the gravity due to the mass of the rest of the universe, $$g_{(12)} = -2\pi G\rho\Delta z + g(\text{universe}) \quad (21)$$

The difference between these two measurements is $$\Delta g = g_{(12)} - g_{(10)} \quad (22)$$

$$\Delta g = -4\pi G\rho\Delta z, \quad (23)$$

which gives $$\rho = \frac{-1}{4\pi G} \frac{\Delta g}{\Delta z}. \quad (24)$$

Therefore, the density of a layer of rock intersected by a well can be directly determined by measuring the gravity on either side of that layer and the distance between those gravity measurement points.

Equations (18) and (24) are not strictly correct when applied to the real earth. Departures of the earth's surface from an ellipsoid and lateral density variations in the subsurface contribute to the variation of gravity in the subsurface. Unwanted or extraneous accelerations caused by topography or mass disturbances connected with the well are usually negligibly small and can be ignored or corrected-for with sufficient accuracy. The corrections for terrain can be found in most general geophysical textbooks (e.g. Dobrin, 1976; Telford et al., 1976) and will not be discussed here.

Figure 3:
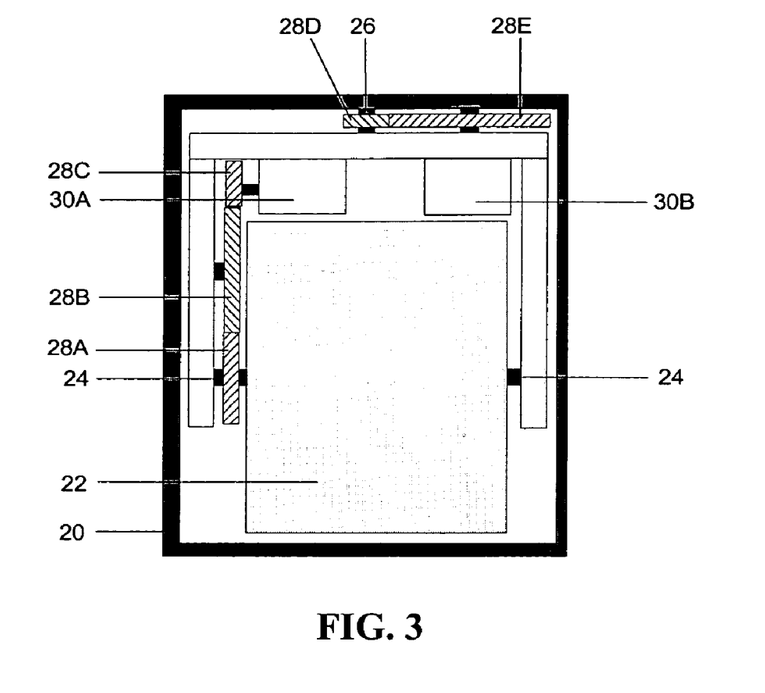
FIG. 3 shows a gravity sensor for making gravity measurements according to embodiments of this disclosure.

Present commercially-available borehole gravity meter instruments are only capable of making measurements to a deviation of less than 14 degrees from vertical. Some prototype borehole gravity meters have been developed that can make measurements up to a deviations of as much as 115 degrees from vertical. FIG. 3 is an illustration of such a borehole gravity meter (20). In principle, the gravity sensor (22) is of any design that can make gravity measurements sufficient to meet its applications and that can be placed in a small enough housing to accommodate its use in a borehole logging environment—see for example Ander et al., 1999b. In practice, such sensors primarily consist of either a metal or a fused quartz relative spring sensor element. The gravity sensor (22) housing is gimbaled about its horizontal axis (24) and its vertical axis (26). The gravity sensor (22) is oriented to vertical by activating motors (30A) and (30B) that are connected to the sensor axes (24) and (26) through a series of gears (28A), (28B), (28C) and (28D). The motors are controlled by commercially-available high precision levels usually located in the gravity sensor housing.

Once borehole gravity instruments are capable of routinely making measurements at significant deviations, then corrections for well deviation can become important. Corrections for borehole deviation is generally straight forward. The correction is $$\Delta z_{true} = \Delta z_{measured} \cos \theta \quad (25)$$

It converts the measured depth to true vertical depth, where $\theta$ is the deviation from vertical. Rivero (1971) and Fitchard (1981) have developed more sophisticated corrections for the case where the well deviation involves doglegs. If corrections are not made for deviations, then the interval gravity gradient can be erroneously low, calculated interval densities can be erroneously high, and interval porosities can be erroneously low.

If a well is significantly deviated, then the theoretical latitude-dependent horizontal gradient of total gravity and any anomalous horizontal gradients of total gravity will contribute to the gravity variations measured down the well. The theoretical latitude-dependent gradient does not exceed 0.2 μgal/ft and applies only to the north-south component of deviation. The actual value is given by 0.8122 sin 2φ mgal/km, where φ is latitude (Nettleton, 1976, p. 80–81). Anomalous horizontal gradients in total gravity occasionally are greater than 1.9 to 3.8 μgal/ft. Values of the theoretical latitude-dependent horizontal gravity gradient together with estimates of anomalous horizontal gradients taken from surface gravity maps can be analyzed with hole azimuth and hole angle data from the well directional survey to determine if corrections for horizontal gravity gradients are necessary. Using present borehole gravity meter technology, in the vast majority of cases, corrections for these effects are unnecessary or are very small.

Once borehole gravity measurements can be made in horizontal or near horizontal wells, then the use of Equation (24) breaks down because $\Delta z \to 0$ and there is no longer a significant vertical gradient between successive gravity measurements. In the horizontal well logging case, a gravity logging survey can be treated like a horizontal land gravity profile.

D. Shortcomings

Despite the technology outlined above, significant shortcomings remain relating to gravity measurement and the use of gravity measurements in applications such as logging and drilling. Namely, conventional technology does not provide for the ability to (a) perform gravity well logging using arrays of gravity sensors; (2) create density pseudosections; (3) make gravity measurements while drilling; and (4) steer a drill bit or other apparatus using gravity measurements. Techniques of this disclosure, however, address these shortcomings, as discussed in detail below.

SUMMARY OF THE INVENTION

The technology described in this disclosure can be applied to a vast array of applications, including drilling and logging applications.

More particularly, techniques are discussed that allow one to make gravity measurements in wells, both during the well-drilling phase and afterward. Gravity measurements can be made during well logging. Gravity measurements can be made using one or more gravity sensors attached to a drill string or a logging string. The general process of making sensor measurements during drilling is sometimes referred to as Logging-While-Drilling (LDW) or Measurement-While-Drilling (MWD), and embodiments of the present disclosure are referred to as Gravity-Measurement-While-Drilling (GMWD).

Embodiments of this disclosure also involve the use of GMWD to steer a drill bit and the use of subsurface iso-gravity contour maps. Still other embodiments involve making multiple gravity measurements using multiple gravity sensors attached along a logging string or otherwise forming an array. In different embodiments, such gravity array measurements can be made simultaneously to provide a significant amount of useful data in a short period of time.

In one respect, the invention involves an apparatus including a plurality of gravity sensors spaced a known distance apart to form a gravity sensor array, the array being coupled to a subsurface logging apparatus. The logging apparatus can include a logging sonde, coil tubing, or wireline. Sensor drift associated with one gravity sensor can be time-correlated with a sensor drift of another gravity sensor. The sensor drifts of all the gravity sensors can be time-correlated with one another. The sensor drift of one or more of the gravity sensors can be corrected using sensor hardware or software. Different gravity sensors can be spaced at different distances from one another. The array can be a linear, vertical array.

In another respect, the invention involves a method of logging using multiple gravity sensors. Gravity sensors are spaced a known distance apart to form a gravity sensor array. The gravity sensor array is placed into a subsurface, and the gravity sensor array is used to make gravity measurements of the subsurface. The gravity sensors can make gravity measurements simultaneously.

In another respect, the invention involves a method in which an apparent density is calculated. The apparent density is plotted as a function of position and gravity point separation to form a density pseudosection. The density pseudosection indicates how the apparent density varies with location and depth. The method can also include forming contour lines associated with the apparent density.

In another respect, the invention involves an apparatus including a gravity sensor coupled to a drilling device, the sensor being configured to make a subsurface gravity measurement after the drilling device begins drilling a hole but before the hole is completed at a time during which the drilling device is temporarily halted. The gravity sensor can be coupled to an instrument package. The instrument package can be coupled to a drilling pipe, which is coupled to a drill bit. The sensor can be configured to make a subsurface gravity measurement when a drilling pipe is added to a drill string. The gravity sensor can be spaced a known distance from one or more other gravity sensors to form a gravity sensor array. The gravity sensor can be a metal zero-length spring gravity sensor. The gravity sensor can include a clamping mechanism configured to withstand vibrations due to drilling.

In another respect, the invention involves a method involving coupling a gravity sensor to a drilling device. A hole is drilled using the drilling device. Drilling is temporarily halted. A gravity measurement is made while drilling is temporarily halted, and drilling of the hole is then resumed. The method can also include using the gravity measurement to steer the drilling device. The method can also include using the gravity measurement to steer the drilling device into and out of salt structures. The method can also include using the gravity measurement to steer the drilling device into porous structures. The method can also include using the gravity measurement to steer the drilling device into compartments formed by up-thrown or down-thrown faulted blocks. The method can also include using the gravity measurement to steer the drilling device into or around man-made structures. The method can also include using the gravity measurement to verify a course of the drilling device. The hole can be a well. The method can also include using the gravity measurement to locate porosity. The method can also include using the gravity measurement to profile a salt interface. The method can also include using the gravity measurement to log carbonate units. The method can also include using the gravity measurement to detect fractures. The method can also include using the gravity measurement to determine reef proximity. The method can also include using the gravity measurement to detect fluid contacts. The method can also include using the gravity measurement to delineate lateral facies changes. The method can also include using the gravity measurement to determine a drill hole position. The drill hole position can be an optimized drill hole position relative to a contact.

In another respect, the invention involves a method comprising steering a drill bit using gravity measurements made while drilling. The method can also include comparing the gravity measurements with modeled gravity. The modeled gravity can include a subsurface gravity map.

In another respect, the invention involves a method for steering a drill bit. A geological model is provided of the ground. A gravity calculation is performed based on the geological model. A subsurface gravity map of the ground is created based on the gravity calculation, and the subsurface gravity map is used to steer a drill bit. Using the subsurface gravity map to steer a drill bit can include: (a) making a gravity measurement during a temporary halt of drilling; (b) using the gravity measurement and the subsurface gravity map to define a drilling course; and (c) sending the drilling course to a drilling guidance system. The method can also include using a geological model to define the drilling course.

Other advantages and features will be apparent to those having ordinary skill in the art through reference to the description below.

BRIEF DESCRIPTION OF THE DRAWINGS

The following drawings form part of the present specification and are included to further demonstrate certain aspects of this disclosure. The invention may be better understood by reference to one or more of these drawings in combination with the detailed description of specific embodiments presented here. Use of identical element numbers among the drawings denotes like or identical structures. The drawings are not to scale and are included for illustration only.

DESCRIPTION OF ILLUSTRATIVE EMBODIMENTS

The reader is notified that the techniques described in this paper are examples only. The description is drawn to particular embodiments. Those embodiments, however, should not be read as limiting the scope of the invention. The invention is defined legally by the claims that issue. For example, claims may not include all the features described in conjunction with an embodiment; in that case, the claim is broader than the embodiment. Likewise, claims may include different combinations from different embodiments. Those having ordinary skill in the art will recognize that changes can be made to the embodiments listed here without departing from the spirit and scope of the disclosure and the spirit, scope, and legal coverage of the claims.

Different embodiments of this disclosure involve the following concepts: (1) gravity well logging using gravity sensors arrays; (2) density pseudosections; (3) Gravity Measurement While Drilling (GMWD) using single or multiple gravity sensors; and (4) geosteering using GMWD.

1. Gravity Well Logging Using Multiple Gravity Sensors

The quality of borehole gravity logging surveys depends on reducing the errors in $\Delta g$ and $\Delta z$ measurements small enough to ensure that calculated interval densities have the required precision.

According to Caton (1981), the effect of $\Delta g_{error}$ on $\bar{\rho}$ is given by $$\bar{\rho}_{error} = \frac{1}{4\pi G}\left(\frac{\Delta g_{error}}{\Delta z}\right) \quad (26)$$

and the effect of $\Delta z_{error}$ on $\bar{\rho}$ is given by $$\bar{\rho}_{error} = \frac{1}{4\pi G}\left(\frac{\Delta g}{\Delta z}\right)\left(\frac{\Delta z_{error}}{\Delta z}\right). \quad (27)$$

The probable error in apparent density, $P_\rho$ for borehole gravity measurements is $$P_\rho = \frac{0.9539\sqrt{h^2 \delta g^2 + \Delta g^2 \delta h^2}}{4\pi G h^2}, \quad (28)$$

where $\delta g$ is the uncertainty in the gravity measurement and $\delta h$ is the uncertainty in the height measurement respectively.

Note that the uncertainty in formation density increases as $\Delta z$ decreases. A typical borehole gravity operation acquires data at an accuracy of between 1 to 5 μgal. For a measurement uncertainty of 1 μgal, there is an approximate error in formation density of less than 0.01 g/cm³ for $\Delta z$ larger than about seven feet. Presently, gravity data is seldom collected with $\Delta z$ of less than 10 feet. An important source of density uncertainty comes from relative depth inaccuracies. Typical wireline operation acquires downhole position at an accuracy of between 0.1 and 0.2 feet. The formation density inaccuracy approaches 0.02 g/cm³ at a $\Delta z$ of about 16 feet. At larger downhole station spacing, density errors can be under 0.01 g/cm³.

Figure 4:
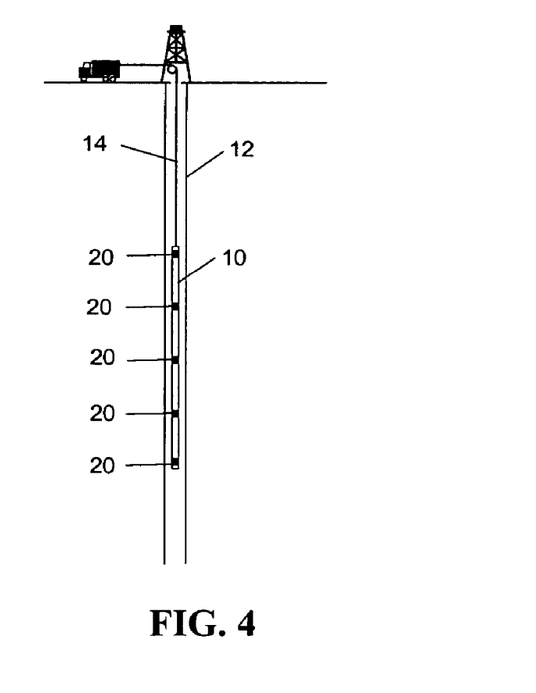
FIG. 4 shows gravity well logging using an array of multiple gravity sensors in a logging sonde, in accordance with embodiments of this disclosure.

According to embodiments of FIG. 4, an array of multiple gravity sensors (20) are placed at intervals in or on a well logging conveyance such as a logging sonde (10), coil tubing, wireline, autonomous vehicle, etc. By precisely knowing the intervals between the multiple gravity sensors (20) along the logging conveyance, then $\Delta z_{error}$ can be made negligible compared to $\Delta g_{error}$. As a result, $\bar{\rho}_{error}$ remains low for much smaller $\Delta z$.

There are several components of $\Delta g_{error}$. See Ander et al., 1999a for a study of the various components of $\Delta g_{error}$ and their comparative magnitudes. The introduction of multiple sensors makes it advantageous for the sensor drift for each of the gravity sensors to be time-correlated with all the other gravity sensors in order to not increase $\Delta g_{error}$. Currently, the component of $\Delta g_{error}$ due to drift is reduced by either correcting for drift or by reducing the sensor drift through hardware and/or software improvements. See textbooks, for example Dobrin (1976) or Telford et al. (1976), for details of how to perform a gravity sensor drift corrections.

Because $\Delta z_{error}$ can be made negligible compared to $\Delta g_{error}$, this allows one to place gravity sensors close and still maintain acceptable levels of $\bar{\rho}_{error}$. The closest spacing between two gravity sensors is limited only by sensor design.

One example of an array of multiple gravity sensors in a logging device can involve 100 gravity sensors, each 30 cm apart, forming a 30-meter-long array of gravity sensors down a borehole. With such a system, one can examine apparent densities given Δz values ranging from 30 cm up to 30 meters in 30 cm increments. The total number of different apparent densities for such an array is 4,950.

In other embodiments, a different number of gravity sensors can be used in an array. For example, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 101, 102, 103, 104, 105, etc. can be used.

Although the spacing between individual sensors can be constant, it need not be. Each sensor in the array can make gravity measurements simultaneously, separately, according to zones, or in any pattern desired by the user. For example, in one embodiment, each sensor in an array may make a measurement at a given time or a given time range. In a different embodiment, a group of sensors defining a first zone may make a measurement followed by a group of sensors in a different zone. With the benefit of this disclosure, those having ordinary skill in the art will recognize that the sensor measurements can be apportioned according to need and desire.

Although shown as a linear, vertical, array in FIG. 4, gravity sensor arrays can take different forms as needed. For example, the array could form curves, or sensors in the arrays may be offset from one another.

With the benefit of this disclosure, those having ordinary skill in the art will recognize that data from the gravity sensor array can be collected, analyzed, and used in various ways. For example, data from the array can be collected and analyzed at a central location and conveyed locally or remotely through the use of computer networks such as the Internet.

2. Density Pseudosections

If x is the number total of gravity points in a down-hole set of gravity data point, then there is an apparent density $\rho_{i,j}$ value, given by:

$$\rho_{i,j} = \frac{1}{-4\pi G} \frac{\Delta g_{i,j}}{\Delta z_{i,j}} i, j = 1, 2, \ldots x \qquad (29)$$

for each (i,j) combination of gravity points with separations of $\Delta z_{i,j}$. There are $$\frac{x(x-1)}{2} \qquad (30)$$

total number of $\rho_{i,j}$ for x number of gravity points.

Figure 5:
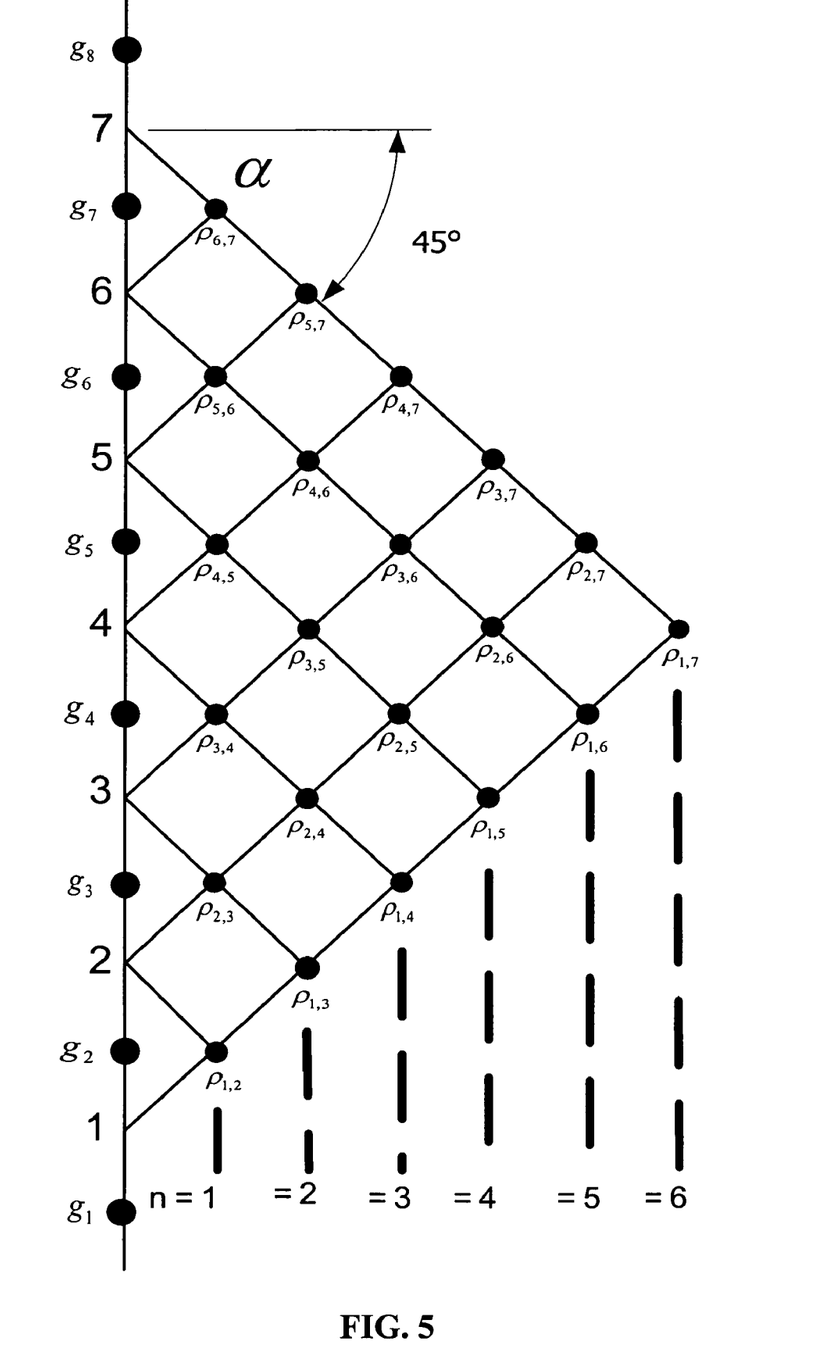
FIG. 5 shows an example density pseudosection method according to embodiments of this disclosure.

Density Pseudosections, illustrated in FIG. 5 for an array of 7 gravity points, can be used to display the apparent density $\rho_{i,j}$ values associated with each $\Delta g_{i,j}/\Delta z_{i,j}$. Density Pseudosections can be compared to electrical pseudosections that are applied to electrical geophysics. (Marshall and Madden, 1959).

A Density Pseudosection is a plot of apparent density as a function of position and gravity point separation. A Density Pseudosection indicates how the apparent density varies with location down the well and horizontal distance away from the well. The apparent density can be converted into models by geophysical inversion (see for example, Blakely, 1996). The $\rho_{i,j}$ can be plotted at a point horizontally to the right (or left) of the well at the midpoint between the $i^{th}$ and $j^{th}$ gravity points. Values of apparent density, $\rho_{i,j}$, for each (i,j) pair of gravity points can be plotted on a horizontal line at the point of intersection of two lines drawn from the base line of the gravity points in the well at an angle $\alpha$, starting at the midpoints between each (i,j) set of gravity points.

Figure 6:
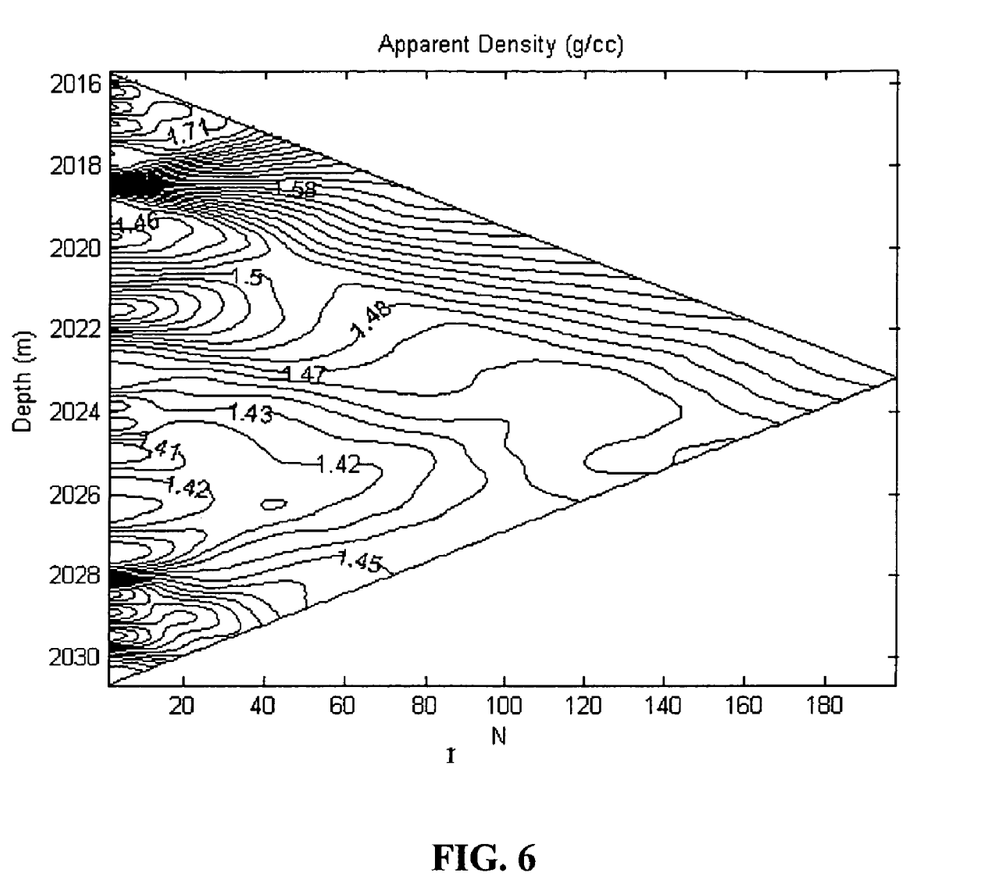
FIG. 6 shows an example density pseudosection in accordance with embodiments of this disclosure.

For convenience, $\alpha=45°$ in FIG. 5 and FIG. 6. In this way, each apparent density value $\rho_{i,j}$ appears at a point midway between the two gravity points, at a horizontal distance to the right (or left) which increases with the n value for the spread of gravity points. So in FIG. 5, the apparent density, $\rho_{1,5}$, which is obtained from gravity point #1 and gravity point #5, is plotted 45° to the right of 1 and 5. Apparent densities for other pairs of gravity points are plotted in a similar fashion. Each column of apparent density points can be numbered sequentially, e.g. n=1, 2, 3, 4, 5, 6 .... The larger the value on n the deeper is the apparent density data point into the formation. Note that $$x = n-1. \qquad (31)$$

Finally, contours can be drawn on the $\rho_{i,j}$ values. FIG. 6 illustrates an example of a contoured Density Pseudosection. The result is a form of two-dimensional plot in horizontal section. Notice that a Density Pseudosection represents a slice through a volume of revolution centered on the well.

3. Gravity Measurement while Drilling

Figure 7:
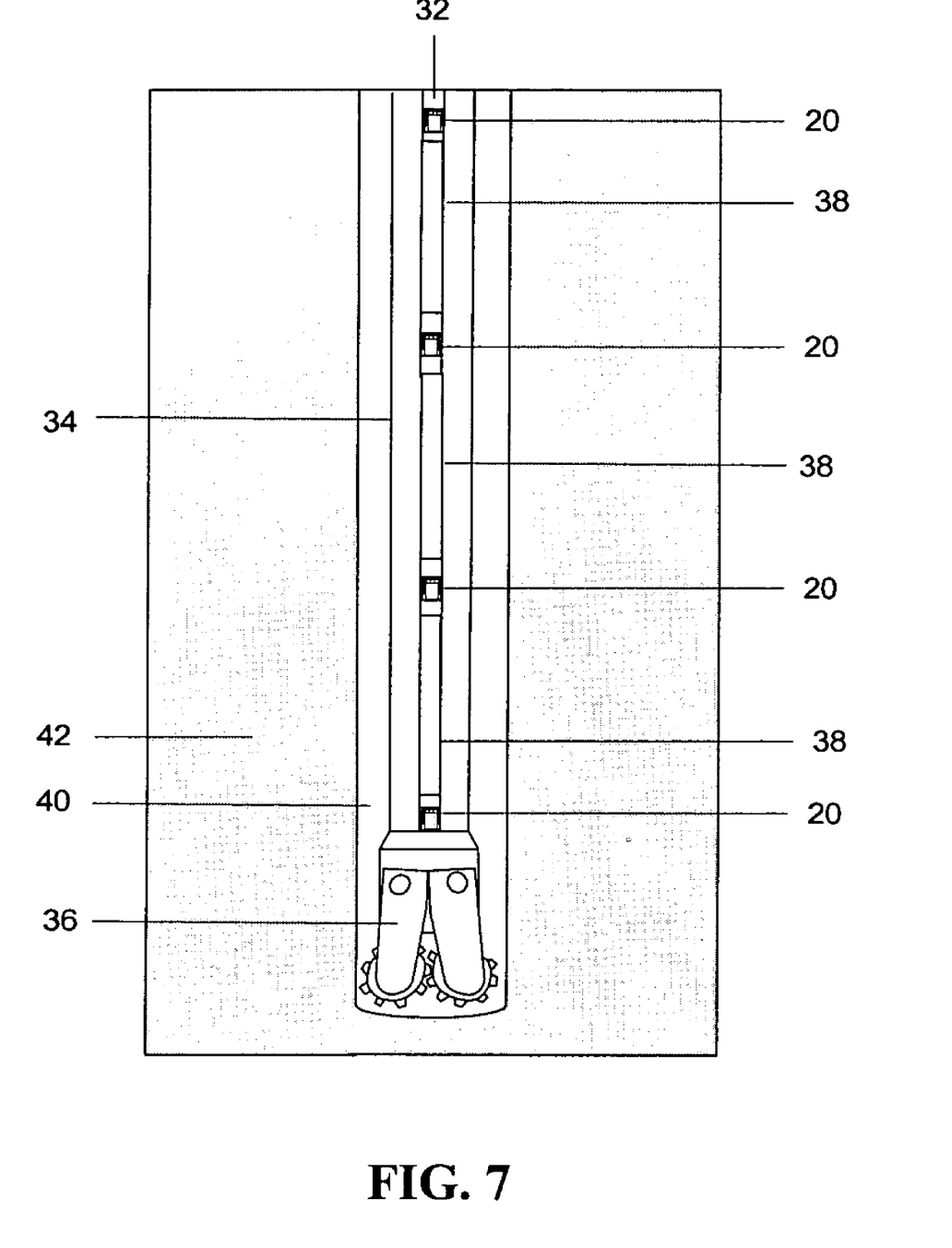
FIG. 7 shows gravity measurement while drilling in accordance with embodiments of this disclosure.

FIG. 7 illustrates Gravity Measurement While Drilling (GMWD). In general, GMWD involves one or more gravity sensors coupled to a device for forming a hole or opening in a surface. In general, the gravity sensor(s) make subsurface gravity measurements after the drilling has begun but before drilling is finished, the measurements being made typically at a time during which drilling is temporarily halted.

In preferred embodiments, and according to FIG. 7, GMWD involves one or more gravity sensor(s) (20) located in operative relationship with one or more instrument packages (32) located in operative relationship with a drilling pipe (34) associated with a drill bit (36). In preferred embodiments, the sensors (20) are located in, on, or near the instrument packages (32). The instrument packages (32) are preferably in, on, or near the drilling pipe (34). The drilling pipe (34) is preferably above the drill bit.

The instrument package may also contain other devices located above and/or below various gravity sensors, such as instruments, other sensors, electronics, thermal cooling devices, communications technology, etc., as required. The instrument package shown in FIG. 7 is for illustrative purposes only and shows four gravity sensors (20) separated by compartments containing other devices (38). Multiple sections of drilling pipe containing gravity sensor arrays can be coupled together to produce continuous gravity sensor arrays that are much longer than a single length of drilling pipe.

Conventional technology does not take gravity data while actually drilling a drill hole (40) through rock (42). One reason is that any sensor accelerations would couple with the true gravity measurement and thus could give false readings (the Principle of Equivalence of acceleration and gravity). A second reason is that vibrations associated with drilling can overpower the gravity sensor and damage or destroy it.

According to embodiments of this disclosure, gravity measurements can be taken while a hole is being formed, but at time in which actual drilling is paused. For example, drilling can be paused whenever another section of drilling pipe is added to a drill string. Drilling pipe typically comes in 30-foot sections. When drill pipe is added, the drilling operation is paused for several minutes. During that time, when the drilling is paused, one or more gravity sensors (e.g., a gravity array if multiple sensors are used) can take gravity data.

The gravity data can be stored electronically and then transmitted up to the surface at any convenient time. The data storage requirements for gravity data from even a large array of gravity sensors is small and can be transmitted at a low baud rate. Data transmission schemes are commercially available and well known in the art, such as mud pulsing (acoustic vibrations of the drilling mud).

If a GMWD device has only one gravity sensor, then the smallest $\Delta z$ would typically be 30 feet, the typical length of each drilling pipe section. But with a GMWD that includes many gravity sensors in each section of drilling pipe, then much shorter $\Delta z$ can be obtained using gravity sensor arrays of any desired length. As discussed above, by knowing the intervals between multiple gravity sensors (20) along the drilling string, then $\Delta z_{error}$ can be made negligible compared to $\Delta g_{error}$. As a result, $\bar{\rho}_{error}$ remains low for much smaller $\Delta z$. Because $\Delta z_{error}$ can be made negligible compared to $\Delta g_{error}$, this allows gravity sensors to be placed as close as desired and still maintain acceptable levels of $\bar{\rho}_{error}$. The closest spacing between two gravity sensors is limited by sensor design only, and arrays can be as long as desired. Density Pseudosections can be applied to the apparent density data that is collected with such GMWD gravity sensor arrays.

As stated earlier, there are several components of $\Delta g_{error}$. See Ander et al., 1999a for a study of the various components of $\Delta g_{error}$ and their comparative magnitudes. In preferred embodiments, the sensor drift for each of the multiple gravity sensors is time correlated with all the other gravity sensors in order to not increase $\Delta g_{error}$. Currently, the component of $\Delta g_{error}$ due to drift is reduced by either correcting for drift or by reducing the sensor drift through hardware and/or software improvements. See textbooks, for example Dobrin (1976) or Telford et al. (1976), for details of how to perform a gravity sensor drift corrections.

A gravity sensor for GMWD is preferably capable of high precision, robust enough to withstand a drilling environment, and possess a small drift rate (although software solutions do exist for correcting for larger drift rates). A GMWD gravity sensor preferably has a sturdy sensor clamping mechanism in order to withstand vibrations due to drilling. Commercially-available gravity sensors have the necessary attributes—for example, metal zero-length spring gravity sensors are acceptable. Those having ordinary skill in the art will recognize that other sensor and associated equipment can be utilized for GMWD applications such as those discussed here.

Applications for GMWD are vast and can include obtaining borehole gravity measurements in a drilling environment and/or using gravity measurements to aid in geosteering of an apparatus such as a drill bit into a proposed target, either geological, structural, or man-made. The following is a non-limiting list of example applications for GMWD:

1. Locating missed porosity away from the well while drilling.
2. Profiling salt interfaces while drilling.
3. Logging carbonate units while drilling.
4. Logging sandstone units while drilling.
5. Detecting fractures while drilling.
6. Determining reef proximity while drilling on a reef target while drilling.
7. Looking ahead through salt while drilling.
8. Detecting the existence and geometry of nearby fluid contacts while drilling.
9. Geosteering:
    a. Into and out of salt structures.
    b. To delineate lateral facies changes.
    c. To optimize drill hole position relative to a fluid, geological, or man-made contact (e.g., a caprock, an oil-water contact, a gas-water contact, a gas-oil contact).
    d. Into porous structures, e.g. porous carbonate structures, fracture zones, sand units, etc.
    e. Into compartments formed by up-thrown or down-thrown faulted blocks.
    f. Into or around man-made structures, e.g. tunnels, underground facilities, underground structures, etc.

Other applications will be apparent to those having ordinary skill in the art, with the benefit of this disclosure.

In each of the above applications, the operation of the GMWD apparatus can be similar. A drilling apparatus is operated to begin formation of an opening. Gravity measurements are taken using one or more gravity sensors coupled to the drilling apparatus. In preferred embodiments, the actual measurements are taken at a time in which a drill bit has paused, but at a time still during the overall process of forming the hole. Gravity measurements are taken using one or more gravity sensor arrays. In preferred embodiments, gravity sensor arrays are utilized, with each gravity sensor being one or more known, predetermined distances from one another. Following the gravity measurements, drilling continues, and other rounds of gravity measurements can be taken as needed or desired. Data resulting from the GMWD can be stored or transmitted as required. In preferred embodiments, the data is transferred to the surface for analysis or use in, for example, forming Density Pseudosections. In different embodiments, the data obtained while drilling can be transmitted to one or more remote users using computer networks such as the Internet. Accordingly, data can be analyzed, viewed, or used remotely offsite. Likewise, offsite monitoring of the GMWD operations can occur.

4. Geosteering Using GMWD

In one embodiment, a drill bit is steered using gravity measurements made while drilling. The gravity measurements can be compared with modeled gravity, such as gravity modeled in a subsurface gravity map.

In one embodiment, a GMWD instrument may make measurements of gravity and transmit the measurements to the surface via, for example, acoustic vibrations of the drilling mud. This data may be combined with drilling location information and then be fed into a computer software system designed to analyze such data, called here a Comparative Scenario System (CSS).

In one embodiment, the CSS is simply a computer system configured to analyze gravity data using, for example, known algorithms and/or mathematical techniques. In a preferred embodiment, however, the CSS is an artificial intelligence computer system that may use a combination of gravitational potential inverse theory, particularly gravity ideal body analysis, forward modeling, and/or numerical analysis techniques (see, e.g. Ander and Huestis, 1987; Huestis and Ander, 1983; Blakely, 1996; Parker, 1975) to rapidly evaluate the GMWD gravity data by comparing it to a set of geological scenarios, which have been converted into two-dimensional or three-dimensional gravitational field subsurface iso-gravity contours. Through this comparison, the CSS may calculate a drilling course correction that it may automatically implement through a drilling downhole guidance system.

In one embodiment, the geological scenarios and subsurface iso-gravity contours may be generated by a team of specialists, e.g., geologists, geophysicists, engineers, technicians, etc. responsible for the prospect, the reservoir analysis package, or intersecting the target. The more known and suspected geological information and/or target information the team can place into the models, the greater accuracy the subsurface iso-gravity contours will have, and the greater will be the value of the GMWD data to guide the drilling effort.

Based on the geological/geophysical input, the system may calculate three-dimensional gravitational subsurface iso-gravity contours and associated error envelope that the drilling unit should stay within for the entire course of the drilling operation. The system may be designed to give the team real-time feedback by transmitting the data and analysis back to the team.

As long as the GMWD data stays within the error envelope predicted by the subsurface iso-gravity contours based on the geological scenarios, the system may continue automatically. But if the scenarios prove to be substantially incorrect, the system may inform the team and ask for a scenario correction. The system permits the team to intervene and make remotely-accessed, real-time course corrections to the drilling operation based on comparative analysis of the actual data obtained near the drill bit in comparison to the subsurface iso-gravity contours of the modeled scenarios.

In one embodiment, through post processing procedures, the artificially intelligent CSS may learn from each successive drilling operation, thus allowing the system to develop adaptive behavior routines that will lead to greater accuracy in producing future scenarios with each successive drilling operation. The CSS may basically follow a similar iterative learning process to that of the development of a race car driver from the time he first gets behind the wheel of a car with his driver's education instructor to the time he wins the Indianapolis 500.

In one embodiment, a drill bit is steered based on sampling the gravity associated with the geology's density variations in real time and automatically making course corrections based on a comparison with subsurface iso-gravity contours of geological scenario models. It is anticipated that this type of use of GMWD may bring about a paradigm shift in directional drilling control.

In other, general embodiments, a drill bit is steered based on any gravity measurements made while drilling. Using gravity measurements to steer an apparatus is, of course, not limited to drill bits and can include other apparatuses as well. For example, real or near-real-time gravity measurements can be utilized to direct any subsurface apparatus that requires some type of steering, course correction, or course verification.

The following examples are included to demonstrate specific embodiments of this disclosure. It should be appreciated by those having ordinary skill in the art that the techniques disclosed in the examples that follow represent techniques discovered by the inventor to function well in the practice of the invention, and thus can be considered to constitute specific modes for its practice. However, those having ordinary skill in the art should, in light of the present disclosure, appreciate that many changes can be made in the specific embodiments which are disclosed and still obtain a like or similar result without departing from the spirit and scope of the invention.

EXAMPLES

The following examples emphasize and re-iterate portions of the detailed description above, providing a (non-limiting) procedure one may use to accomplish the techniques of this disclosure.

Once the location and proposed subsurface path for a well has been decided upon, exemplary embodiments of the present disclosure can involve one or more of the following steps.

1. Produce a best-estimate subsurface three-dimensional density model based on geological models developed from geology, geophysics, engineering, and/or well data. Such a predicted density model can give the best estimate as well as a range of probable subsurface geometries and densities in the form of a probability envelope.

2. Create a three-dimensional grid that will cover the subsurface region of interest, including a proposed well path. Throughout the three-dimensional grid, calculate the predicted vertical component of gravity due to the predicted density model obtained in the previous step. This gravity model can include an error envelope that corresponds to the error envelope obtained in the previous step. The predicted gravity model that was developed in the previous step can be entered into a data processing and modeling computer software, which can be termed a Comparative Scenario System (CSS).

3. A Gravity Measurement While Drilling (GMWD) instrument can be added to a drilling unit in operative relation with the drill bit (e.g., above the drill bit or, generally, coupled to or near the drill bit). Then, a well is drilled. Each time or at selected times during which the drilling effort is stopped (e.g., when it is stopped to add another length of drilling pipe), the GMWD unit can measure the vertical component of gravity and the dip angle of the well. The drilling effort can also be temporarily stopped whenever an extra set of gravity readings is required or desired. A GMWD unit contains one or more gravity sensors designed to operate in a drilling environment. Because gravity defines the vertical direction within the earth, a gravity meter should be leveled to high precision. The angle between vertical as defined by the gravity meter and the axis of the drill pipe is the dip angle at the measurement point.

4. The gravity data and the dip angle data can be transmitted (e.g., via acoustic vibrations of the drilling mud) up the well to the CSS, which may be located at the well surface. In addition, the total length of the pipe strung in the well can also be entered into the CSS. The dip angle as a function of depth and the total pipe length can be used to determine the location of each of the GMWD measurements, and hence the location of the drill hole with depth. CSS may be an artificial intelligence computer software system that uses a combination of gravitational potential forward modeling, and possibly inverse methods, as well as numerical analysis techniques known in the art to rapidly evaluate the GMWD gravity data by comparing it to the predicted three-dimensional gravitational field that was developed in step 2.

5. The CSS will make a decision. Using the predetermined tolerances set by the predicted gravity error envelope, it can determine if the drill bit is on course or needs a course correction. It can also determine if the predicted model is sufficiently incorrect to require human intervention.
6. If the location of the drill bit is within the pre-determined tolerances, the CSS can then calculate a drilling course correction that will automatically be implemented through the drilling down-hole guidance system. As long as the GMWD data stays within a gravity error envelope, the system may continue automatically. The CSS input data, output predicted verses observed correlations and the output course corrections can also be transmitted via, e.g., the Internet in real or near real time to anybody that needs to monitor the drilling process, such as the exploration team or other decision makers (The Team) that might be located back in an office somewhere. Note that the more known and suspected geological and/or target information that can be placed into the predicted models, the greater will be the value of the GMWD data to guide the drilling effort.
7. Based on the data that is transmitted back to The Team, a human decision could be made at any time to intervene and send back, via, e.g., the Internet to the CSS at the drill site, a drilling course correction. The CSS may then pass the correction to a drilling down-hole guidance system for implementation.
8. If, in step 5, the CSS finds that the predicted gravity scenarios prove to be substantially incorrect, the system may inform The Team and ask for a correction to the predicted gravity model. The system permits The Team to intervene and make remotely-accessed, real-time course corrections to the drilling operation based on comparative analysis of the actual data obtained near the drill bit in comparisons to the predicted gravity models with error envelopes. The CSS can assist in obtaining and/or implementing such course corrections.

The CSS may be designed such that, through post processing procedures, the CSS will learn from each successive drilling operation, thus allowing the system to develop adaptive behavior routines that will lead to greater accuracy in producing future scenarios with each successive drilling operation.

REFERENCES

Each of the references listed below is incorporated by reference in its entirety:
1. U.S. Pat. No. 6,082,194 Gravity meter
2. U.S. Pat. No. 5,970,787 Downhole gravity tool
3. U.S. Pat. No. 5,962,782 Gravity gradiometer accelerometers
4. U.S. Pat. No. 5,962,781 Apparatus for the measurement of gravitational fields
5. U.S. Pat. No. 5,892,151 Differential interferometric ballistic gravity measurement apparatus and method
6. U.S. Pat. No. 5,821,413 Gravity gradiometry in a wellbore using a virtual long-baseline
7. U.S. Pat. No. 5,804,772 Gravity gradiometer
8. U.S. Pat. No. 5,734,104 Laplace gravity gradiometer
9. U.S. Pat. No. 5,728,935 Method and apparatus for measuring gravity with level arm correction
10. U.S. Pat. No. 5,668,315 Gravity gradiometer with flexural pivot bearing
11. U.S. Pat. No. 5,661,649 Airborne gravity and magnetic field surveying method
12. U.S. Pat. No. 5,637,797 Optical fiber gravity meter
13. U.S. Pat. No. 5,461,914 Optical fiber gravity meter
14. U.S. Pat. No. 5,448,912 Borehole gravity density measuring system
15. U.S. Pat. No. 5,357,802 Rotating accelerometer gradiometer
16. U.S. Pat. No. 5,351,122 Absolute gravity inline measuring apparatus incorporating improved operating features
17. U.S. Pat. No. 5,341,681 Stepped gravity gradiometer
18. U.S. Pat. No. 5,224,380 Superconduction six-axis accelerometer
19. U.S. Pat. No. 5,218,864 Layer density determination using surface and deviated borehole gravity
20. U.S. Pat. No. 5,216,920 Multifold shipboard gravity upgraded with still readings
21. U.S. Pat. No. 5,204,568 Superconducting bearing for borehole and surveying gradimeters
22. U.S. Pat. No. 4,992,656 Rotation, acceleration, and gravity sensors using quantum-mechanical matter-wave interferometry with neutral atoms and molecules
23. U.S. Pat. No. 4,935,883 Apparatus and method for leveling a gravity measurement device
24. U.S. Pat. No. 4,874,942 Rotation, acceleration, and gravity sensors using quantum-mechanical matter-wave interferometry with neutral atoms and molecules
25. U.S. Pat. No. 4,841,772 Three-axis superconduction gravity gradiometer
26. U.S. Pat. No. 4,809,545 Gravimetry logging
27. U.S. Pat. No. 4,718,274 Gravity meter digitizer
28. U.S. Pat. No. 4,638,669 Quantum tunneling cantilever accelerometer
29. U.S. Pat. No. 4,625,547 Borehole gravimetry logging
30. U.S. Pat. No. 4,602,508 Continuous gravity gradient logging
31. U.S. Pat. No. 4,599,896 High accuracy accelerometer
32. U.S. Pat. No. 4,596,139 Depth referencing system for a borehole gravimetry system
33. U.S. Pat. No. 4,517,836 Method for determining oil saturation in a subsurface formation
34. U.S. Pat. No. 4,475,386 Borehole gravimetry system
35. U.S. Pat. No. 4,457,168 Automated borehole gravity meter system
36. U.S. Pat. No. 4,457,077 Borehole gravimetry
37. U.S. Pat. No. 4,445,371 Gravity meter and method
38. U.S. Pat. No. 4,435,981 Airborne gravity surveying
39. U.S. Pat. No. 4,422,329 Apparatus and method for measuring changes in ambient gravity fields
40. U.S. Pat. No. 4,419,891 Support gravity measurement instrument
41. U.S. Pat. No. 4,384,487 Dynamically restrained inertial reference instrument and reliability sensor
42. U.S. Pat. No. 4,369,657 Gravimeter
43. U.S. Pat. No. 4,353,248 Well logging to determine the nature and extent of mud filtrate penetration
44. U.S. Pat. No. 4,271,702 Gravity sensor
45. U.S. Pat. No. 4,255,969 Ring laser gravity gradiometer
46. U.S. Pat. No. 4,201,226 Combination instrument for taking biomechanical measurements
47. U.S. Pat. No. 4,040,189 Method and apparatus for leveling an instrument in a well bore
48. Airy, G. B., 1856, Account of pendulum experiments undertaken in the Harton Colliery, for the purpose of determining the mean density of the earth: Royal Soc. London Philos. Trans., v. 14–15, p. 297–355.
49. Ander, M. E. and S. P. Huestis, 1987, Gravity Ideal Bodies: Geophysics, 52, 1265–1278.
50. Ander, M. E., and D. A. Chapin, Borehole gravimetry: A review, *Society of Exploration Geophysics 67th Annual International Meeting Expanded Abstracts*, Dallas, GM 3.1, 531–534, Nov. 2–7, 1997a.

51. Ander, M. E., T. Summers, and M. Gruchalla, The LaCoste & Romberg gravity meter: system analysis and instrumental errors, *Geophysics,* 64, 1708–1819, 1999a.
52. Ander, M. E., J. Govro, J. Shi., and D. Aliod, Deep Penetration Density: A new borehole gravity meter, *Society of Exploration Geophysics 69th Annual International Meeting Expanded Abstracts,* Houston, 1999b.
53. Benfield, A. E., 1937, Note on the variation of gravity with depth: Zeitschrift fur Geophysik, v. 13, p. 157–158.
54. Beyer, L. A., 1971, The vertical gradient of gravity in vertical and near-vertical boreholes: U.S. Geological Survey Open-File Report 71-42, 229p.
55. Blakely, J. R., 1996, Potential theory in gravity and magnetic applications: Cambridge University Press, 441p.
56. Caton, P. W., 1981, Improved methods for reducing borehole gravity data—Application and analyses of reduced gravity plots: SPWLA, $22^{nd}$ Annual Logging Symposium Trans., p. RR1–RR44.
57. Dobrin, M., 1976, *Introduction to Geophysical Prospecting,* $3^{rd}$ Edition, Mc Graw Hill, 630 p.
58. Fitchard, E. E., 1981, Randomly simulated borehole tests accuracy of directional survey methods: Oil and Gas Journal, June 29, pp. 140–150.
59. Gutenberg, B., 1959, physics of the Earth's Interior: Academic Press, New York, 240 p.
60. Hammer, S., 1963, Rock densities and vertical gradient of gravity in the earth's crust: Jour. Geophs. Research, v. 15, no. 4, p. 637–652.
61. Hammer, S., 1970, The anomalous vertical gradient of gravity, Geophysics, 35, no. 1, p. 153–157.
62. Huestis, S. P., and M. E. Ander, 1983, IDB2—A fortran program for computing extremal bounds in gravity data interpretation: Geophysics, 48, 999–1010.
63. Marshall, D. J., and T. R. Madden, 1959, Induced polarization: a study of its causes. *Geophysics,* 24, 790–816.
64. Miller A. H. and M. J. S. Innes, 1953, Application of gravimeter observations to the determination of the mean density of the earth and of rock densities in mines: Canada Dominion Observatory Ottawa Pubs., v. 16, no. 4, p. 3–17.
65. Nettleton, 1976, Gravity and magnetics in oil prospecting, McGraw Hill Book Company, New York, 464 p.
66. Parker, R. L., 1994; Geophysical Inverse Theory: Princeton University Press, 386p.
67. Ramsey, A. S., 1940, An introduction to the theory of Newtonian Attraction: Cambridge Univ. Press, Cambridge, England, 184 p.
68. Rivero, R. T., 1971, Use of the curvature method to determine true vertical reservoir thickness: journal of Petroleum Technology, April, p. 491–496.
69. Talwani, M., 1965, Computation with help of a digital computer of magnetic anomalies caused by bodies of arbitrary shape: Geophysics, v. 30, no. 5, p. 797–817.
70. Telford, W. M., L. P. Geldart, R. E. Sheriff, and D. A. Keys, 1976, Applied Geophysics, Cambridge University Press, 860 pp.

The invention claimed is:

1. An apparatus comprising: a subsurface logging apparatus; and a plurality of gravity sensors coupled to the subsurface logging apparatus, the sensors being spaced a known, distance apart to form a gravity sensor array, where different gravity sensors are spaced at different distances from one another.

2. The apparatus of claim 1, the logging apparatus comprising a logging sonde, coil tubing, or wireline.

3. The apparatus of claim 1, where a sensor drift associated with one gravity sensor is time-correlated with a sensor drift of another gravity sensor.

4. The apparatus of claim 3, where sensor drifts of all the gravity sensors are time-correlated with one another.

5. The apparatus of claim 1, further comprising sensor hardware or software configured to correct sensor drift of one or more of the gravity sensors.

6. The apparatus of claim 1, where the array is a linear, vertical array.

* * * * *